Patented Nov. 24, 1931

1,833,568

UNITED STATES PATENT OFFICE

EUGEN GLIETENBERG, OF LEVERKUSEN/RHINE, GERMANY, ASSIGNOR TO GENERAL ANILINE WORKS, INC., OF NEW YORK, N. Y., A CORPORATION OF DELAWARE

WATER-INSOLUBLE AZO DYESTUFFS

No Drawing. Application filed December 27, 1928, Serial No. 328,859, and in Germany January 5, 1928.

The present invention relates to new water-insoluble azo dyestuffs and to the materials dyed therewith.

According to the present invention, water-insoluble dyestuffs dyeing red to bluish red tints are obtainable by coupling with a 2:3-hydroxynaphthoic acid arylamide, containing no sulfonic acid and no carboxylic acid group, a diazocompound of a substituted metaphenylendiamine of the following formula:

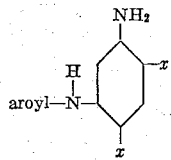

wherein one $x$ stands for halogen, an alkyl or alkoxy group, the other $x$ for halogen or an alkyl group, and wherein the aroyl residue does not contain a sulfonic acid or carboxylic acid group.

My new dyestuffs which may be represented by the following general formula:

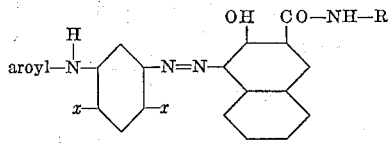

wherein one $x$ stands for halogen, an alkyl, or alkoxy group, the other $x$ for halogen or an alkyl group, R stands for a benzene or naphthalene nucleus, which may be substituted, except by a sulfonic acid or carboxylic acid group, and wherein the aroyl residue does not contain a sulfonic acid or carboxylic acid group, may be prepared in substance or on fiber. In their dry pulverized form they are generally orange to blue powders, insoluble in water, soluble in sulfuric acid and yielding upon reduction with stannous chloride and hydrochloric acid the substituted meta diamine used as starting material and a 1-amino-2:3-hydroxynaphthoic acid arylide. The dyeings prepared on the fiber are distinguished by an excellent fastness to washing, chlorine and kier boiling.

In preparing the dyestuffs on the fiber, especially on cotton, the material to be dyed is impregnated with a grounding liquor, containing the 2:3-hydroxy-naphthoic arylide, centrifugated or wrung out, and developed for about ½ hour in a diazo bath, rinsed, soaped in a boiling bath, rinsed and dried.

In dyeing 50 grams of cotton the grounding liquor is prepared by dissolving together about ½ gram to about 5 grams of the 2:3-hydroxynaphthoic acid arylide, about 1 to about 10 ccm. caustic soda lye of 34° Bé., and about 1 to about 10 ccm. Turkey red oil of 50% strength and making up the whole with water to 1 liter.

The developing bath is prepared by diazotizing about 1 gram to about 3 grams of the base with about 1 to about 3 ccm. of hydrochloric acid of 22° Bé. and about 3 to about 9 ccm. of sodium nitrite 1:10, while cooling with ice. When diazotization is complete, the liquid is neutralized with about 4 to about 20 ccm. of sodium acetate 1:5, whereupon 10 grams of common salt are added, and the whole is made up with water to 1 liter.

The following examples serve to illustrate my invention, without limiting it thereto:

*Example 1.*—50 grams of bleached cotton yarn are impregnated with a grounding liquor, containing 2 grams per liter of 2:3-hydroxynaphthoic acid-β-naphthylamide and developed with a developing liquor, containing in a liter 2.6 grams of diazotized 1-amino-2-methyl-4-chloro-5-benzoylaminobenzene, rinsed and soaped. A clear red is obtained possessing a particularly striking fastness to kier boiling. The dyestuff has the following formula:

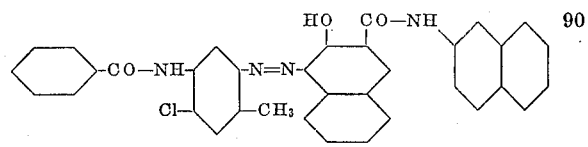

*Example 2.*—On replacing the arylide used in Example 1 by 2:3-hydroxynaphthoic acid-4-chloro-2-toluidide and developing with diazotized 1-amino-2-chloro-4-methyl-5-benzolaminobenzene, a bluish red is obtained of similar fastness properties. The dyestuff has the following formula:

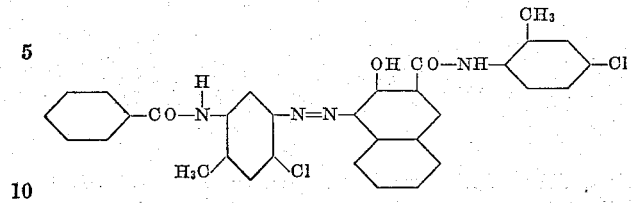

*Example 3.*—50 grams of cotton yarn are impregnated with a grounding liquor containing in a liter 2 grams of 2.3-hydroxynaphthoic acid β-naphthylamide, is wrung out and developed in a solution containing in a liter 2.8 grams diazotized 1-amino-2.4-dichloro-5-benzoylaminobenzene, soaped in a boiling bath, rinsed and dried. A red is obtained of excellent fastness to kier boiling. The dyestuff has the following formula:

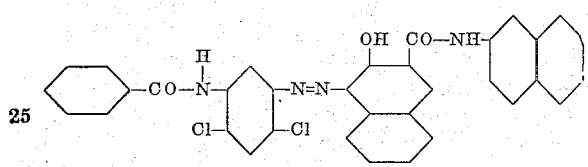

*Example 4.*—50 grams of cotton yarn are impregnated for ½ hour with a solution containing 2.0 grams of 2.3-hydroxynaphthoic acid m-nitranilide, wrung out and introduced into a bath containing in a liter 2.8 grams diazotized 1-amino-2-methoxy-4-chloro-5-benzoylaminobenzene. The yarn is wrung out, soaped in a boiling bath, rinsed and dried. A clear pink of excellent fastness to kier boiling is obtained.

I claim:

1. As new products, the azo dyestuffs of the general formula:

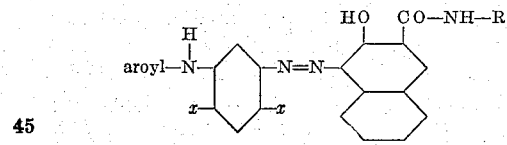

wherein one $x$ stands for halogen, an alkyl, or alkoxy group, the other $x$ for halogen or an alkyl group, R stands for a radical of the benzene or naphthalene series containing no sulfonic acid or carboxylic acid group, and wherein the aroyl residue does not contain a sulfonic acid or carboxylic acid group, said dyestuffs being orange to blue powders, soluble in sulfuric acid, insoluble in water, giving, when produced on cotton, red to bluish red shades of excellent fastness to chlorine, washing and kier boiling.

2. As new products, the azo dyestuffs of the general formula:

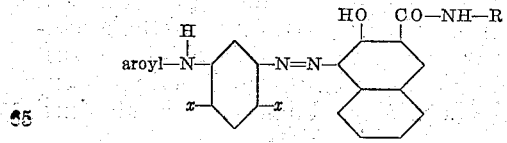

wherein one $x$ stands for an alkyl group and the other $x$ for halogen, an alkyl or alkoxy group, R stands for a radical of the benzene or naphthalene series containing no sulfonic acid or carboxylic acid group, and wherein the aroyl residue does not contain a sulfonic acid or carboxylic acid group, said dyestuffs being orange to blue powders, soluble in sulfuric acid, insoluble in water, giving, when produced on cotton, red to bluish red shades of excellent fastness to chlorine, washing and kier boiling.

3. As new products, the azo dyestuffs of the general formula:

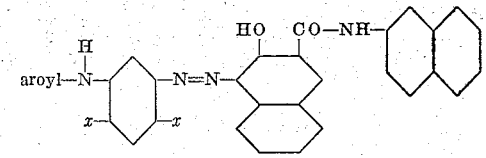

wherein one $x$ stands for an alkyl group, the other $x$ stands for a halogen atom, and wherein the aroyl residue does not contain a sulfonic acid or carboxylic acid group, said dyestuffs being orange to blue powders, soluble in sulfuric acid, insoluble in water, giving, when produced on cotton, red to bluish red shades of excellent fastness to chlorine, washing and kier boiling.

4. As new products, the azo dyestuffs of the general formula:

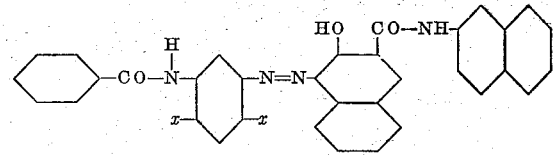

wherein one $x$ stands for an alkyl group and the other $x$ stands for a halogen atom, being red powders, soluble in sulfuric acid, insoluble in water, giving, when produced on cotton, bluish red shades of excellent fastness to chlorine, washing and kier boiling.

5. As a new product, the azo dyestuff of the formula:

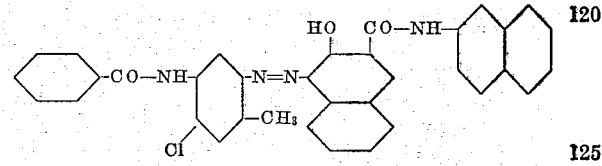

being a red powder, soluble in sulfuric acid, insoluble in water and giving, when produced on cotton, bluish red shades of excellent fastness to light, chlorine, washing and kier boiling.

6. As a new product the azo dyestuff of the formula:

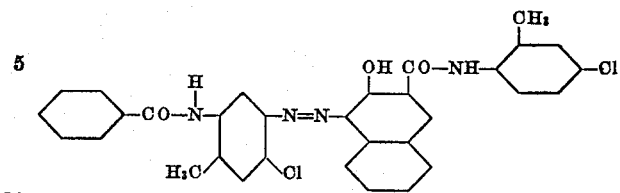

being a bluish-red powder, soluble in sulfuric acid, insoluble in water, and giving, when produced on cotton, bluish-red shades of excellent fastness to chlorine, washing and kier boiling.

7. As a new product the azo dyestuff of the formula:

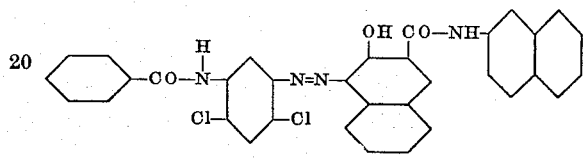

being a red powder, soluble in sulfuric acid, insoluble in water, and giving, when produced on cotton, bluish-red shades of excellent fastness to chlorine, washing and kier boiling.

In testimony whereof I have hereunto set my hand.

EUGEN GLIETENBERG. [L. S.]